(12) United States Patent
Golden et al.

(10) Patent No.: US 9,864,761 B1
(45) Date of Patent: Jan. 9, 2018

(54) READ OPTIMIZATION OPERATIONS IN A STORAGE SYSTEM

(71) Applicant: PURE Storage, Inc., Mountain View, CA (US)

(72) Inventors: Christopher Golden, Mountain View, CA (US); David Grunwald, San Francisco, CA (US); Jianting Cao, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 434 days.

(21) Appl. No.: 14/455,121

(22) Filed: Aug. 8, 2014

(51) Int. Cl.
  *G06F 7/00* (2006.01)
  *G06F 17/30* (2006.01)

(52) U.S. Cl.
  CPC .............. *G06F 17/30289* (2013.01)

(58) Field of Classification Search
  None
  See application file for complete search history.

(56) References Cited

U.S. PATENT DOCUMENTS

| | | | |
|---|---|---|---|
| 5,208,813 A | 5/1993 | Stallmo | |
| 5,403,639 A | 4/1995 | Belsan | |
| 5,940,838 A | 8/1999 | Schmuck et al. | |
| 6,263,350 B1 | 7/2001 | Wollrath et al. | |
| 6,412,045 B1 | 6/2002 | DeKoning et al. | |
| 6,718,448 B1 | 4/2004 | Ofer | |
| 6,757,769 B1 | 6/2004 | Ofer | |
| 6,799,283 B1 | 9/2004 | Tamai et al. | |
| 6,834,298 B1 | 12/2004 | Singer et al. | |
| 6,850,938 B1 | 2/2005 | Sadjadi | |
| 6,915,434 B1 | 7/2005 | Kuroda | |
| 6,973,549 B1 | 12/2005 | Testardi | |
| 7,028,216 B2 | 4/2006 | Aizawa et al. | |
| 7,028,218 B2 | 4/2006 | Schwarm et al. | |
| 7,039,827 B2 | 5/2006 | Meyer et al. | |
| 7,216,164 B1 | 5/2007 | Whitmore et al. | |

(Continued)

FOREIGN PATENT DOCUMENTS

| | | |
|---|---|---|
| CN | 103370685 A | 10/2013 |
| CN | 103370686 A | 10/2013 |

(Continued)

OTHER PUBLICATIONS

Microsoft Corporation, "GCSettings.IsServerGC Property", Retrieved Oct. 27, 2013 via the WayBack Machine, 3 pages.

(Continued)

*Primary Examiner* — Tuan A Pham
(74) *Attorney, Agent, or Firm* — Edward J. Lenart; Kennedy Lenart Spraggins, LLP

(57) ABSTRACT

A system and method for performing read optimization of a volume while allowing user operations to target the volume. Read optimization is prevented from being performed for a top level of the medium graph for a given volume, wherein the top level is in a read-write state. Rather than waiting for the given volume to be idle so as to perform read optimization, read optimization is run at lower levels in the medium graph of the given volume. This allows user operations to modify the medium graph of the top level of the given volume while simultaneously read optimization is being run on mediums which underlie the top level.

11 Claims, 9 Drawing Sheets

(56) References Cited

U.S. PATENT DOCUMENTS

| | | |
|---|---|---|
| 7,783,682 B1 | 8/2010 | Patterson |
| 7,873,619 B1 | 1/2011 | Faibish et al. |
| 7,913,300 B1 | 3/2011 | Flank et al. |
| 7,933,936 B2 | 4/2011 | Aggarwal et al. |
| 7,979,613 B2 | 7/2011 | Zohar et al. |
| 8,086,652 B1 | 12/2011 | Bisson et al. |
| 8,117,464 B1 | 2/2012 | Kogelnik |
| 8,205,065 B2 | 6/2012 | Matze |
| 8,352,540 B2 | 1/2013 | Anglin et al. |
| 8,527,544 B1 | 9/2013 | Colgrove et al. |
| 8,560,747 B1 | 10/2013 | Tan et al. |
| 8,621,241 B1 | 12/2013 | Stephenson |
| 8,700,875 B1 | 4/2014 | Barron et al. |
| 8,751,463 B1 | 6/2014 | Chamness |
| 8,806,160 B2 | 8/2014 | Colgrove et al. |
| 8,874,850 B1 | 10/2014 | Goodson et al. |
| 8,959,305 B1 | 2/2015 | Lecrone et al. |
| 9,423,967 B2 | 8/2016 | Colgrove et al. |
| 9,436,396 B2 | 9/2016 | Colgrove et al. |
| 9,436,720 B2 | 9/2016 | Colgrove et al. |
| 9,454,476 B2 | 9/2016 | Colgrove et al. |
| 9,454,477 B2 | 9/2016 | Colgrove et al. |
| 9,513,820 B1 | 12/2016 | Shalev |
| 9,516,016 B2 | 12/2016 | Colgrove et al. |
| 9,552,248 B2 | 1/2017 | Miller et al. |
| 2002/0038436 A1 | 3/2002 | Suzuki |
| 2002/0087544 A1 | 7/2002 | Selkirk et al. |
| 2002/0178335 A1 | 11/2002 | Selkirk et al. |
| 2003/0140209 A1 | 7/2003 | Testardi |
| 2004/0049572 A1 | 3/2004 | Yamamoto et al. |
| 2005/0066095 A1* | 3/2005 | Mullick ............ G06F 17/30171 710/200 |
| 2005/0216535 A1 | 9/2005 | Saika et al. |
| 2005/0223154 A1 | 10/2005 | Uemura |
| 2006/0074940 A1 | 4/2006 | Craft et al. |
| 2006/0136365 A1 | 6/2006 | Kedem et al. |
| 2006/0155946 A1 | 7/2006 | Ji |
| 2007/0067585 A1 | 3/2007 | Ueda et al. |
| 2007/0162954 A1 | 7/2007 | Pela |
| 2007/0171562 A1 | 7/2007 | Maejima et al. |
| 2007/0174673 A1 | 7/2007 | Kawaguchi et al. |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2008/0059699 A1 | 3/2008 | Kubo et al. |
| 2008/0065852 A1 | 3/2008 | Moore et al. |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0275928 A1 | 11/2008 | Shuster |
| 2008/0285083 A1 | 11/2008 | Aonuma |
| 2008/0307270 A1 | 12/2008 | Li |
| 2009/0006587 A1 | 1/2009 | Richter |
| 2009/0037662 A1 | 2/2009 | La Frese et al. |
| 2009/0204858 A1 | 8/2009 | Kawaba |
| 2009/0228648 A1 | 9/2009 | Wack |
| 2009/0300084 A1 | 12/2009 | Whitehouse |
| 2010/0057673 A1 | 3/2010 | Savov |
| 2010/0058026 A1 | 3/2010 | Heil et al. |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0153620 A1 | 6/2010 | McKean et al. |
| 2010/0153641 A1 | 6/2010 | Jagadish et al. |
| 2010/0191897 A1 | 7/2010 | Zhang et al. |
| 2010/0250802 A1 | 9/2010 | Waugh et al. |
| 2010/0250882 A1 | 9/2010 | Hutchison et al. |
| 2010/0281225 A1 | 11/2010 | Chen et al. |
| 2010/0287327 A1 | 11/2010 | Li et al. |
| 2011/0072300 A1 | 3/2011 | Rousseau |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0238634 A1 | 9/2011 | Kobara |
| 2012/0023375 A1 | 1/2012 | Dutta et al. |
| 2012/0036309 A1 | 2/2012 | Dillow et al. |
| 2012/0117029 A1 | 5/2012 | Gold |
| 2012/0198175 A1* | 8/2012 | Atkisson ............ G06F 12/0804 711/135 |
| 2012/0330954 A1 | 12/2012 | Sivasubramanian et al. |
| 2013/0042052 A1* | 2/2013 | Colgrove ............ G06F 3/0608 711/103 |
| 2013/0046995 A1 | 2/2013 | Movshovitz |
| 2013/0047029 A1 | 2/2013 | Ikeuchi et al. |
| 2013/0091102 A1 | 4/2013 | Nayak |
| 2013/0205110 A1 | 8/2013 | Kettner |
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0052946 A1 | 2/2014 | Kimmel |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0201150 A1 | 7/2014 | Kumarasamy et al. |
| 2014/0215129 A1 | 7/2014 | Kuzmin et al. |
| 2014/0229131 A1* | 8/2014 | Cohen ............... G11C 16/0483 702/64 |
| 2014/0229452 A1 | 8/2014 | Serita et al. |
| 2014/0281308 A1 | 9/2014 | Lango et al. |
| 2014/0325115 A1 | 10/2014 | Ramsundar et al. |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |
| 2016/0098199 A1 | 4/2016 | Golden et al. |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-95/02349 A1 | 1/1995 |
| WO | WO-99/13403 A1 | 3/1999 |
| WO | WO-2008/102347 A1 | 8/2008 |
| WO | WO-2010/071655 A1 | 6/2010 |

OTHER PUBLICATIONS

Microsoft Corporation, "Fundamentals of Garbage Collection", Retrieved Aug. 30, 2013 via the WayBack Machine, 11 pages.

* cited by examiner

| Medium ID | Range | State | Basis | Offset | Underlying | Stable |
|---|---|---|---|---|---|---|
| 1 | 0-999 | Q | 1 | 0 | 1 | Y |
| 2 | 0-99 | QU | 2 | 0 | 1 | Y |
| 2 | 100-999 | Q | 2 | 0 | 1 | Y |
| 5 | 0-999 | RU | 5 | 0 | 1 | N |
| 8 | 0-499 | R | 8 | 500 | 2 | N |
| 10 | 0-999 | QU | 10 | 0 | 1 | Y |
| 14 | 0-999 | RU | 14 | 0 | 1 | Y |
| 18 | 0-999 | RU | 18 | 0 | 10 | N |
| 25 | 0-999 | RU | 25 | 0 | 14 | Y |
| 33 | 0-999 | RU | 33 | 0 | 14 | N |
| 35 | 0-299 | RU | 35 | 400 | 25 | N |
| 35 | 300-499 | RU | 35 | -300 | 18 | Y |
| 35 | 500-899 | RU | 35 | -400 | 33 | N |

Q – Quiescent; R – Registered; U – Unmask

*After Search Optimization Operation for Medium 54*

| Med. | Block | Page | Level |
|---|---|---|---|
| 54 | 200 | 18 | 7 |
| 37 | 700 | 21 | 12 |
| 38 | 300 | 11 | 8 |
| 54 | 0 | 21 | 12 |
| 54 | 100 | 11 | 8 |

Address Translation Table 500B

| Med. | Range | Offset | Underlying |
|---|---|---|---|
| 37 | 0-999 | 0 | 37 |
| 38 | 0-499 | 500 | 37 |
| 54 | 0-299 | 0 | 54 |
| 81 | 0-299 | 0 | 54 |

Medium Mapping Table 505B

| 81 | 54 | RW |
| 54 | 54 | RO |
| 38 | 37 | RO |
| 37 | 37 | RO |

Medium Graph 510B

---

*Before Search Optimization Operation for Medium 54*

| Med. | Block | Page | Level |
|---|---|---|---|
| 54 | 200 | 18 | 7 |
| 37 | 700 | 21 | 12 |
| 38 | 300 | 11 | 8 |

Address Translation Table 500A

| Med. | Range | Offset | Underlying |
|---|---|---|---|
| 37 | 0-999 | 0 | 37 |
| 38 | 0-499 | 500 | 37 |
| 54 | 0-299 | 200 | 38 |
| 81 | 0-299 | 0 | 54 |

Medium Mapping Table 505A

| 81 | 54 | RW |
| 54 | 38 | RO |
| 38 | 37 | RO |
| 37 | 37 | RO |

Medium Graph 510A

FIG. 5

| Medium ID | Range | State | Basis | Offset | Underlying | Stable |
|---|---|---|---|---|---|---|
| 1 | 0-999 | Q | 1 | 0 | 1 | Y |
| 2 | 0-99 | QU | 2 | 0 | 1 | Y |
| 2 | 100-999 | Q | 2 | 0 | 1 | Y |
| 5 | 0-99 | RU | 5 | 0 | 2 | N |
| 5 | 100-999 | QU | 5 | 0 | 1 | N |

READ OPTIMIZATION OPERATIONS IN A STORAGE SYSTEM

BACKGROUND

Technical Field

Embodiments described herein relate to storage systems, and more particularly, to techniques for performing read optimization in a storage system.

Description of the Related Art

Various applications executing on a computer system may store and access data stored on one or more storage devices of a storage array. Often, data is stored in a volume. Generally speaking, a "volume" is a logical interface used by an operating system or other application executing on a computer system to access data stored in a data storage system, such as a storage array. The volume may serve, at least in part, as an abstraction that hides how the underlying data is stored.

In a typical storage system, a volume may be allowed to be either the target of user operations (e.g., snapshots, copy operations, etc.) or the target of background operations (e.g., garbage collection operations, read optimization operations, etc.), with only one type of operation allowed to run at any given time. Consequently, user operations may not be permitted while background operations are being performed. Additionally, if user operations are frequently being performed, then background operations may not have an adequate opportunity to run. This may prevent desired optimizations and the latency of accesses to data may reach undesirable levels.

SUMMARY OF THE EMBODIMENTS

Various embodiments of systems and methods for performing read optimization operations are contemplated.

In one embodiment, a storage array may include a storage controller and one or more storage devices. In various embodiments, the storage controller utilizes metadata to track stored client data. Such metadata may include volumes and mediums to track stored client data. Each volume may be mapped to a single anchor medium, and the anchor medium for a given volume may be mapped to any number of levels of underlying mediums. A medium may be defined as an identifiable, logical, grouping of data. In various embodiments, each medium below the anchor medium may correspond to a previously taken snapshot of the volume.

Over time, the amount of metadata used to track and access stored data may grow or otherwise become inefficient in its organization. For example, the medium hierarchy of the volume may grow to include a large number of mediums. Traversing the metadata, such as traversing a medium hierarchy with many levels, may be inefficient when accessing the given volume. Therefore, read optimization operations may be performed to optimize the metadata and make read operations targeting the volume more efficient.

In various embodiments, for a first volume with a first anchor medium and one or more underlying mediums, read optimization may be prevented from being performed on the first anchor medium. However, read optimization may be performed on one or more of the underlying mediums within the medium hierarchy of the first volume. In this way, various user operations may be performed on the first volume while read optimization operations are being performed in the background. For example, a snapshot may be taken of the first volume while at the same time read optimization operations are being performed on one or more of the underlying mediums of the first volume.

These and other embodiments will become apparent upon consideration of the following description and accompanying drawings.

BRIEF DESCRIPTION OF THE DRAWINGS

FIG. 3 illustrates one embodiment of a medium mapping table.

FIG. 5 is a generalized block diagram of one embodiment of a search optimization operation.

FIG. 6 illustrates one embodiment of a portion of a medium mapping table.

Figure 1:
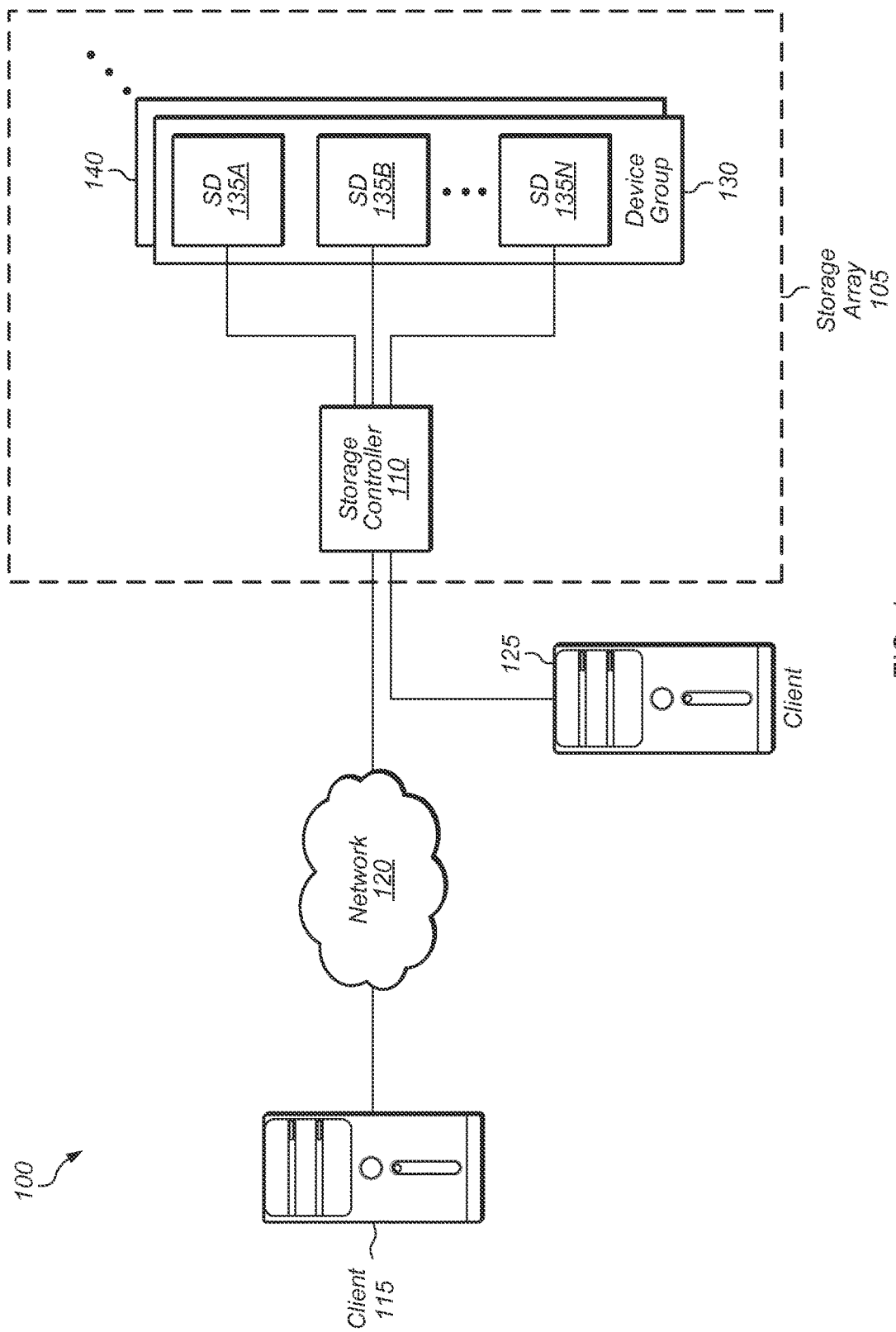
FIG. 1 is a generalized block diagram illustrating one embodiment of a storage system.

While the methods and mechanisms described herein are susceptible to various modifications and alternative forms, specific embodiments are shown by way of example in the drawings and are herein described in detail. It should be understood, however, that drawings and detailed description thereto are not intended to limit the methods and mechanisms to the particular form disclosed, but on the contrary, are intended to cover all modifications, equivalents and alternatives apparent to those skilled in the art once the disclosure is fully appreciated.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a storage array . . . ." Such a claim does not foreclose the system from including additional components (e.g., a network, a server, a display device).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a generalized block diagram of one embodiment of a storage system 100 is shown. Storage system 100 may include storage array 105, clients 115 and 125, and network 120. Storage array 105 may include storage controller 110 and storage device groups 130 and 140, which are representative of any number of storage device groups. As shown, storage device group 130 includes storage devices 135A-N, which are representative of any number and type of storage devices (e.g., solid-state drives (SSDs)). Storage controller 110 may be coupled directly to client computer system 125, and storage controller 110 may be coupled remotely over network 120 to client computer system 115. Clients 115 and 125 are representative of any number of clients which may utilize storage controller 110 for storing and accessing data in system 100. It is noted that some systems may include only a single client, connected directly or remotely to storage controller 110. It is also noted that storage array 105 may include more than one storage controller in some embodiments.

Storage controller 110 may include software and/or hardware configured to provide access to storage devices 135A-N. Although storage controller 110 is shown as being separate from storage device groups 130 and 140, in some embodiments, storage controller 110 may be located within one or each of storage device groups 130 and 140. Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-N to prevent loss of data due to the failure of a device or the failure of storage locations within a device. Storage controller 110 may also utilize any of various deduplication techniques for reducing the amount of data stored in devices 135A-N by deduplicating common data segments.

Storage controller 110 may be configured to create and manage mediums in system 100. Accordingly, a set of mediums may be recorded and maintained by storage controller 110. The term "medium" as is used herein is defined as a logical grouping of data. A medium may have a corresponding identifier with which to identify the logical grouping of data. Each medium may also include or be associated with mappings of logical block numbers to content location, deduplication entries, and other information. In one embodiment, medium identifiers may be used by the storage controller but medium identifiers may not be user-visible. A user (or client) may send a data request accompanied by a volume ID to specify which data is targeted by the request, and the storage controller may map the volume ID to a medium ID and then use the medium ID when processing the request.

A medium may be virtual such that it is identified by a unique ID, and all blocks stored to a volume while the corresponding medium is open for writing may be recorded as <medium, block number>. Each medium logically comprises all of the blocks in the medium. However, only the blocks that were written to the medium from the time the medium was created to the time the medium was closed are recorded and mappings to these blocks may also be maintained with the medium.

The term "medium" is not to be confused with the terms "storage medium" or "computer readable storage medium". A storage medium is defined as an actual physical device (e.g., SSD, HDD) that is utilized to store data. A computer readable storage medium (or non-transitory computer readable storage medium) is defined as a physical storage medium configured to store program instructions which are executable by a processor or other hardware device. Various types of program instructions that implement the methods and/or mechanisms described herein may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, multiple mapping tables may be maintained by storage controller 110. These mapping tables may include a medium mapping table, a volume-to-medium mapping table, an address translation table, a deduplication table, an overlay table, and/or other tables. In some embodiments, the information stored in two or more of these tables may be combined into a single table. The medium mapping table may be utilized to record and maintain the mappings between mediums and underlying mediums and the volume-to-medium mapping table may be utilized to record and maintain the mappings between volumes and anchor mediums. In one embodiment, a volume may be mapped to a single anchor medium which is in a read-write state. The anchor medium may be the entry point for the volume in the medium mapping table. The anchor medium may then be mapped to any number of underlying mediums (or portions of mediums) in the medium mapping table. A sector of a medium may be referred to as "underlying" a volume if the sector of the medium is included within the volume. In other words, a given sector of a medium may "underlie" a volume if the anchor medium of the volume maps to the given sector.

The address translation table may include a plurality of entries, with each entry holding a virtual-to-physical mapping for a corresponding data component. This mapping table may be used to map logical read/write requests from each of the client computer systems 115 and 125 to physical locations in storage devices 135A-N. A "physical" pointer value may be read from the mappings associated with a given medium or snapshot during a lookup operation corresponding to a received read/write request. This physical pointer value may then be used to locate a storage location within the storage devices 135A-N. It is noted that the physical pointer value may not be direct. Rather, the pointer may point to another pointer, which in turn points to another pointer, and so on. For example, a pointer may be used to access another mapping table within a storage device of the storage devices 135A-N that identifies another pointer. Consequently, one or more levels of indirection may exist between the physical pointer value and a target storage location.

In various embodiments, the address translation table may be accessed using a key comprising a medium or snapshot ID, a logical or virtual address, a sector number, and so forth. A received read/write storage access request may identify a particular volume, sector, and length. The volume ID may be mapped to a medium or snapshot ID using the volume to medium mapping table. A sector may be a logical block of data stored in a medium. Sectors may have different sizes on different mediums. The address translation table may map a medium in sector-size units. In one embodiment, the key value for accessing the address translation table may be the combination of the medium ID and the received sector number. A key is an entity in a mapping table that distinguishes one row of data from another row. In other embodiments, other types of address translation tables may be utilized.

In one embodiment, the address translation table may map mediums and block offsets to physical pointer values. Depending on the embodiment, a physical pointer value may be a physical address or a logical address which the storage device maps to a physical location within the device. In one embodiment, an index may be utilized to access the address translation table. The index may identify locations of mappings within the address translation table. The index may be queried with a key value generated from a medium ID and sector number, and the index may be searched for one or more entries which match, or otherwise correspond to, the key value. Information from a matching entry may then be used to locate and retrieve a mapping which identifies a storage location which is the target of a received read or write request. In one embodiment, a hit in the index provides a corresponding virtual page ID identifying a page within the storage devices of the storage system, with the page storing both the key value and a physical pointer value. The page may then be searched with the key value to find the physical pointer value.

The deduplication table may include information used to deduplicate data at a fine-grained level. The information stored in the deduplication table may include mappings between one or more calculated hash values for a given data component and a physical pointer to a physical location in one of the storage devices 135A-N holding the given data component. In addition, a length of the given data component and status information for a corresponding entry may be stored in the deduplication table. It is noted that in some embodiments, one or more levels of indirection may exist between the physical pointer value and the corresponding physical storage location. Accordingly, in these embodiments, the physical pointer may be used to access another mapping table within a given storage device of the storage devices 135A-N.

In one embodiment, storage controller 110 may be configured to execute read optimization processes for optimizing the various volumes and mediums stored in system 100. In some embodiments, storage controller 110 may be configured to execute multiple read optimization processes simultaneously, with each process optimizing a separate volume. When performing a read optimization process, storage controller 110 may select read-only mediums for optimizing rather than optimizing at the volume or anchor medium level of the medium hierarchy. By optimizing read-only mediums lower down in the medium hierarchy, user operations (e.g., snapshots, xcopy operations) can still target the volumes which include these mediums. IN such embodiments, user operations target the top level of the medium hierarchy of the volume while read optimization targets levels below the top level of the medium hierarchy of the volume. Therefore, user operations can run simultaneously with read optimization operations since these operations target different mediums in the medium hierarchy.

Network 120 may utilize a variety of techniques including wireless connection, direct local area network (LAN) connections, wide area network (WAN) connections such as the Internet, a router, storage area network, Ethernet, and others. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP.

Client computer systems 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 115 and 125 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

It is noted that in alternative embodiments, the number and type of client computers, storage controllers, networks, storage device groups, and data storage devices is not limited to those shown in FIG. 1. At various times one or more clients may operate offline. In addition, during operation, individual client computer connection types may change as users connect, disconnect, and reconnect to system 100. Further, the systems methods described herein may be applied to directly attached storage systems or network attached storage systems and may include a host operating system configured to perform one or more aspects of the described methods. Numerous such alternatives are possible and are contemplated.

Figure 2:
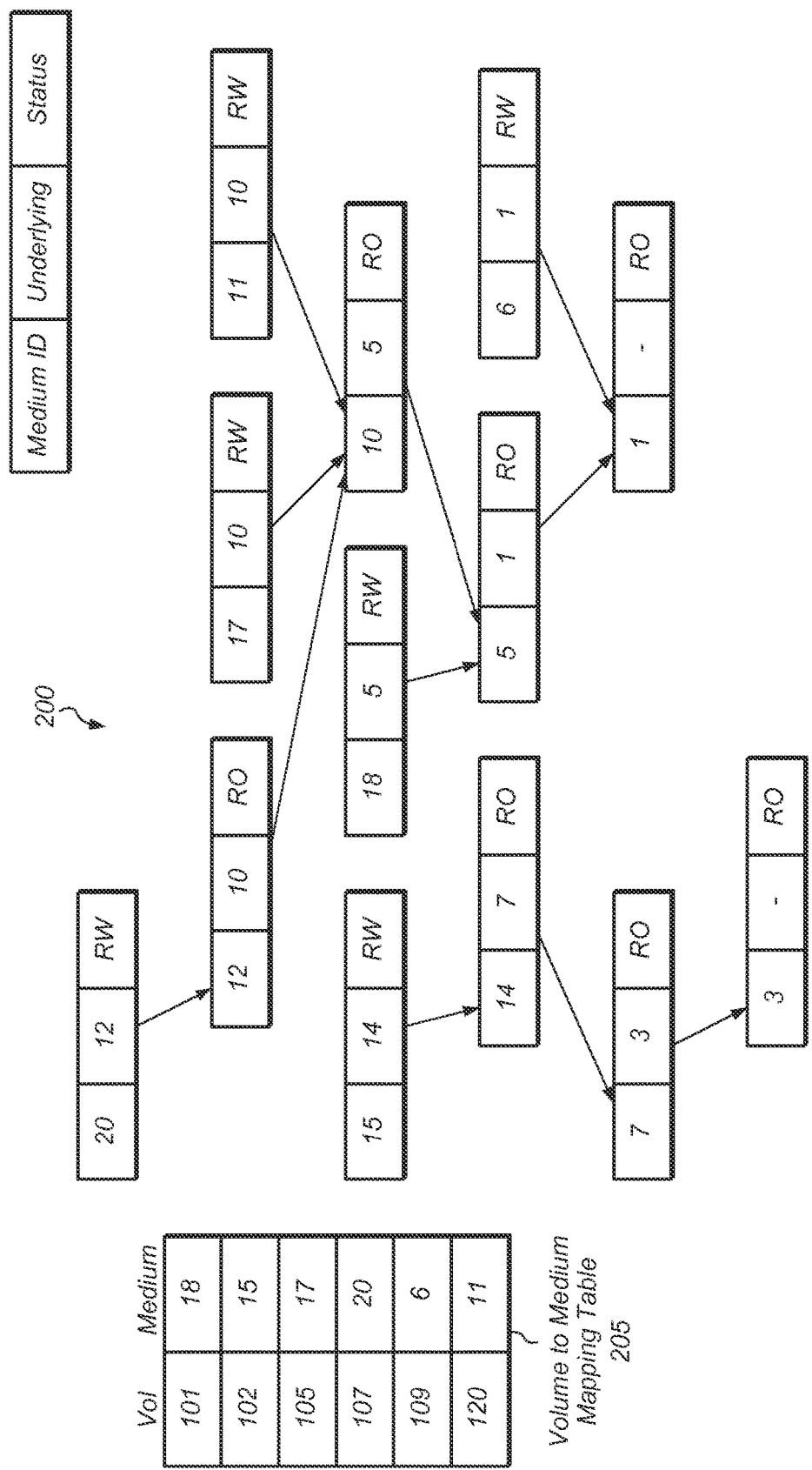
FIG. 2 is a generalized block diagram of one embodiment of a directed acyclic graph (DAG) of mediums.

Referring now to FIG. 2, a block diagram illustrating a directed acyclic graph (DAG) 200 of mediums is shown. Also shown is a volume to medium mapping table 205 which shows which anchor medium a volume maps to for each volume in use by a storage system. Volumes may be considered pointers into graph 200.

It is noted that the term "volume to medium mapping table" may refer to multiple tables rather than just a single table. Similarly, the term "medium mapping table" may also refer to multiple tables rather than just a single table. It is further noted that volume to medium mapping table 205 is only one example of a volume to medium mapping table. Other volume to medium mapping tables may have other numbers of entries for other numbers of volumes.

Each medium is depicted in graph 200 as three conjoined boxes, with the leftmost box showing the medium ID, the middle box showing the underlying medium, and the rightmost box displaying the status of the medium (RO—read-only) or (RW—read-write). Read-write mediums may be referred to as active mediums, while read-only mediums may represent previously taken snapshots. A snapshot may be defined as the state of a logical collection of data (e.g., volume, medium, etc.) at a given point in time. Within graph 200, a medium points to its underlying medium. For example, medium 20 points to medium 12 to depict that medium 12 is the underlying medium of medium 20. Medium 12 also points to medium 10, which in turn points to medium 5, which in turn points to medium 1. Some mediums are the underlying medium for more than one higher-level medium. For example, three separate mediums (12, 17, 11) point to medium 10, two separate mediums (18, 10) point to medium 5, and two separate mediums (6, 5) to medium 1. Each of the mediums which is an underlying medium to at least one higher-level medium has a status of read-only.

The set of mediums on the bottom left of graph 200 is an example of a linear set. As depicted in graph 200, medium 3 was created first and then a snapshot was taken resulting in medium 3 becoming stable (i.e., the result of a lookup for a given block in medium 3 will always return the same value after this point). Medium 7 was created with medium 3 as its underlying medium. Any blocks written after medium 3 became stable were labeled as being in medium 7. Lookups to medium 7 return the value from medium 7 if one is found, but will look in medium 3 if a block is not found in medium 7. At a later time, a snapshot of medium 7 is taken, medium 7 becomes stable, and medium 14 is created. Lookups for blocks in medium 14 would check medium 7 and then medium 3 to find the targeted logical block. Eventually, a snapshot of medium 14 is taken and medium 14 becomes stable while medium 15 is created. At this point in graph 200, medium 14 is stable with writes to volume 102 going to medium 15.

Volume to medium mapping table 205 maps user-visible volumes to mediums. Each volume may be mapped to a single medium, also known as the anchor medium. This anchor medium, as with all other mediums, may take care of its own lookups. A medium on which multiple volumes depend (such as medium 10) tracks its own blocks independently of the volumes which depend on it. Each medium may also be broken up into ranges of blocks, and each range may be treated separately in medium DAG 200.

In one embodiment, read optimization and garbage collection operations may be performed on read-only mediums that a volume references, rather than being performed at the highest level of the volume. This allows a user operation (e.g., snapshots, xcopy) which modifies the medium hierarchy to be performed on a given volume while at the same time read optimization and garbage collection operations are being performed to the mediums below the given volume. Read optimization operations the representation of mediums which are not modifiable by users while garbage collection is a process in which storage locations are freed and made available for reuse by the system. Performing read optimization helps make it faster to traverse the medium mapping tables for future memory operations. It is noted that read optimization operations may also be referred to as search optimization operations. The medium hierarchy of a volume refers to all of the mediums which are referenced by the volume and which underlie the volume. The anchor medium of a given volume is at the top of the medium hierarchy, while the oldest medium referenced by the given volume is at the bottom of the medium hierarchy. There may be any number of levels in the medium hierarchy between the anchor medium and the oldest medium, depending on the number of snapshots which have been taken of the corresponding volume. However, performing read optimization operations may reduce the number of levels of the medium hierarchy for an existing volume.

In one embodiment, mediums that are in a read-only state may be read optimized rather than performing read optimization at an anchor medium which is in a read-write state. However, in some cases, when two separate anchor mediums are being read optimized, two separate read optimization processes may attempt to target the same underlying medium. For example, if one process were read optimizing volume 107, and another process were read optimizing volume 120, both of these processes could attempt to read optimize the same medium (e.g., medium 10, 5, or 1) at the same time. If the first process for volume 107 were read optimizing medium 10, then prior to the second process initiating read optimization for medium 10, the second process may detect that the first process is already read optimizing medium 10 and then wait until the first process has finished before proceeding. By performing read optimization on medium 10, future operations to volume 120 and 107 may be more efficient even if read optimization is not performed on the anchor mediums or mediums above medium 10 in the medium hierarchies.

Referring now to FIG. 3, one embodiment of a medium mapping table 300 is shown. Any portion of or the entirety of medium mapping table 300 may be stored in storage controller 110 and/or in one or more of storage devices 135A-N. A volume identifier (ID) may be used to access volume to medium mapping table 205 to determine a medium ID corresponding to the volume ID. This medium ID may then be used to access medium mapping table 300.

It is noted that table 300 is merely one example of a medium mapping table, and that in other embodiments, other medium mapping tables, with other numbers of entries, may be utilized. In addition, in other embodiments, a medium mapping table may include other attributes and/or be organized in a different manner than that shown in FIG. 3. It is also noted that while tables are described herein, any suitable data structure may be used to store the mapping table information in order to provide for efficient searches (e.g., b-trees, binary trees, hash tables, etc.). All such data structures are contemplated.

Each medium may be identified by a medium ID, as shown in the leftmost column of table 300. A range attribute may also be included in each entry of table 300, and the range may be in terms of data blocks. The size of a block of data (e.g., 4 KB, 8 KB) may vary depending on the embodiment. A medium may be broken up into multiple ranges, and each range of a medium may be treated as if it is an independent medium with its own attributes and mappings. Throughout this disclosure, there are various terms used to describe mediums as well as various techniques described for operating or performing actions on mediums. These terms and techniques also apply to ranges of mediums. For example, medium ID 2 has two separate ranges. Range 0-99 of medium ID 2 has a separate entry in table 300 from the entry for range 100-999 of medium ID 2.

Although both of these ranges of medium ID 2 map to underlying medium ID 1, it is possible for separate ranges of the same source medium to map to different underlying mediums. For example, separate ranges from medium ID 35 map to separate underlying mediums. For example, range 0-299 of medium ID 35 maps to underlying ID 18 with an offset of 400. This indicates that blocks 0-299 of medium ID 35 map to blocks 400-699 of medium ID 18. Additionally, range 300-499 of medium ID 35 maps to underlying medium ID 33 with an offset of −300 and range 500-899 of medium ID 35 maps to underlying medium ID 5 with an offset of −400. These entries indicate that blocks 300-499 of medium ID 35 map to blocks 0-199 of medium ID 33 while blocks 500-899 of medium ID 35 map to blocks 100-499 of medium ID 5. It is noted that in other embodiments, mediums may be broken up into more than three ranges.

The state column of table 300 records information that allows lookups for blocks to be performed more efficiently. A state of "Q" indicates the medium is quiescent, "R" indicates the medium is registered, and "U" indicates the medium is unmasked. In the quiescent state, a lookup is performed on exactly one or two mediums specified in table 300. In the registered state, a lookup is performed recursively. If an entry in table 300 is unmasked, then this indicates that a lookup should be performed in the basis medium. If an entry is masked, then the lookup should only be performed in the underlying medium. Although not shown in table 300 for any of the entries, another state "X" may be used to specify that the source medium is unmapped. The unmapped state indicates that the source medium contains no reachable data and can be discarded. This unmapped state may apply to a range of a source medium. If an entire medium is unmapped, then the medium ID may be entered into a sequence invalidation table and eventually discarded.

In one embodiment, when a medium is created, the medium is in the registered state if it has an underlying medium, or the medium is in the quiescent state if it is a brand-new volume with no pre-existing state. As the medium is written to, parts of it can become unmasked, with mappings existing both in the medium itself and the underlying medium. This may be done by splitting a single range into multiple range entries, some of which retain the original masked status, and others of which are marked as unmasked.

In addition, each entry in table 300 may include a basis attribute, which indicates the basis of the medium, which in this case points to the source medium itself. Each entry may also include an offset field, which specifies the offset that should be applied to the block address when mapping the source medium to an underlying medium. This allows mediums to map to other locations within an underlying medium rather than only being built on top of an underlying medium from the beginning block of the underlying medium. As shown in table 300, medium 8 has an offset of 500, which indicates that block 0 of medium 8 will map to block 500 of its underlying medium (medium 1). Therefore, a lookup of medium 1 via medium 8 will add an offset of 500 to the original block number of the request. The offset column allows a medium to be composed of multiple mediums. For example, in one embodiment, a medium may be composed of a "gold master" operating system image and per-VM (virtual machine) scratch space. Other flexible mappings are also possible and contemplated.

Each entry also includes an underlying medium attribute, which indicates the underlying medium of the source medium. If the underlying medium points to the source medium (as with medium 1), then this indicates that the source medium does not have an underlying medium, and all lookups will only be performed in the source medium. Each entry may also include a stable attribute, with "Y" (yes) indicating the medium is stable (or read-only), and with "N" (no) indicating the medium is read-write. In a stable medium, the data corresponding to a given block in the medium never changes, though the mapping that produces this data may change. For example, medium 2 is stable, but block 50 in medium 2 might be recorded in medium 2 or in medium 1, which may be searched logically in that order, though the searches may be done in parallel if desired. In one embodiment, a medium will be stable if the medium is used as an underlying medium by any medium other than itself.

Figure 4:
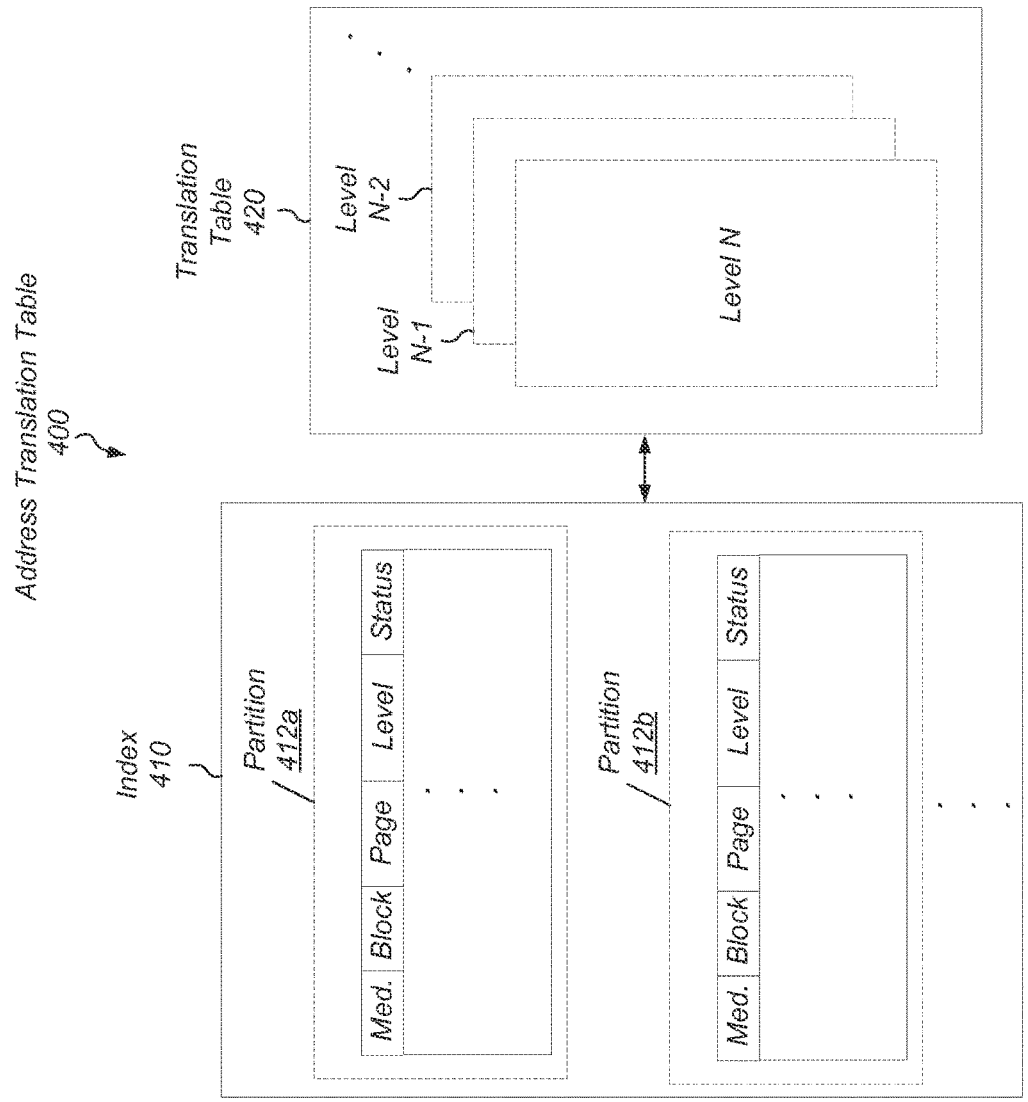
FIG. 4 illustrates a block diagram of one embodiment of an address translation table.

Turning now to FIG. 4, a block diagram of one embodiment of an address translation table 400 is shown. In one embodiment, a given received read/write request by a storage controller may identify a particular volume, sector (or block number), and length. The volume may be translated into a medium ID using the volume-to-medium mapping table. The medium ID and block number may then be used to access index 410 of address translation table 400 to locate an index entry corresponding to the specific medium ID and block number. The index entry may store a level ID and page ID of a corresponding entry in translation table 420. Using the level ID, page ID, and a key value generated from the medium ID and block number, the corresponding translation table entry may be located and a pointer to the storage location may be returned from this entry. The pointer may be used to identify or locate data stored in the storage devices of the storage system. It is noted that in various embodiments, the storage system may include storage devices (e.g., SSDs) which have internal mapping mechanisms. In such embodiments, the pointer in the mapping table entry may not be an actual physical address per se. Rather, the pointer may be a logical address which the storage device maps to a physical location within the device.

For the purposes of this discussion, the key value used to access entries in index 410 is the medium ID and block number corresponding to the data request. However, in other embodiments, other types of key values may be utilized. In these embodiments, a key generator may generate a key from the medium ID, block number, and/or one or more other requester data inputs, and the key may be used to access index 410 and locate a corresponding entry.

When index 410 is accessed with a query key value, index 410 may be searched for one or more entries which match, or otherwise correspond to, the key value. Attributes from the matching entry may then be used to locate and retrieve a mapping in translation table 420. In one embodiment, a hit in the index provides a corresponding level ID and page ID identifying a level and page within translation table 420 storing both the key value and a corresponding physical pointer value. The page identified by corresponding page ID may be searched with the key value so as to retrieve the corresponding pointer.

Translation table 420 may comprise one or more levels. For example, in various embodiments, table 420 may comprise 16 to 64 levels, although another number of levels supported within a mapping table is possible and contemplated. Three levels labeled Level "N", Level "N−1" and Level "N−2" are shown for ease of illustration. Each level within table 420 may include one or more partitions. In one embodiment, each partition is a 4 kilo-byte (KB) page. In one embodiment, a corresponding index 410 may be included in each level of translation table 420. In this embodiment, each level and each corresponding index 410 may be physically stored in a random-access manner within the storage devices.

In one embodiment, index 410 may be divided into partitions, such as partitions 412a-412b. In one embodiment, the size of the partitions may range from a 4 kilobyte (KB) page to 256 KB, though other sizes are possible and are contemplated. Each entry of index 410 may store a key value, and the key value may be based on the medium ID, block number, and other values. For the purposes of this discussion, the key value in each entry is represented by the medium ID and block number. This is shown merely to aid in the discussion of mapping between mediums and entries in index 410. In other embodiments, the key values of entries in index 410 may vary in how they are generated.

In various embodiments, portions of index 410 may be cached, or otherwise stored in a relatively fast access memory. In various embodiments, the entire index 410 may be cached. In some embodiments, where the primary index has become too large to cache in its entirety, or is otherwise larger than desired, secondary, tertiary, or other index portions may be used in the cache to reduce its size. In addition to the above, in various embodiments mapping pages corresponding to recent hits may be cached for at some period of time. In this manner, processes which exhibit accesses with temporal locality can be serviced more rapidly (i.e., recently accessed locations will have their mappings cached and readily available).

In some embodiments, index 410 may be a secondary index which may be used to find a key value for accessing a primary index. The primary index may then be used for locating corresponding entries in address translation table 400. It is to be understood that any number of levels of indexes may be utilized in various embodiments. In addition, any number of levels of redirection may be utilized for performing the address translation of received data requests, depending on the embodiment. In another embodiment, index 410 may be a separate entity or entities from address translation table 400. It is noted that in other embodiments, other types of indexes and translation tables may be utilized to map medium IDs and block numbers to physical storage locations.

Referring now to FIG. 5, one embodiment of a search optimization operation is shown. Rather than performing the search optimization operation on anchor medium 81, which would cause the anchor medium 81 to be unavailable for user operations such as snapshots and xcopy operations, a search optimization operation may be performed on the underlying medium of anchor medium 81, which in this case is medium 54. The search optimization operation may be performed to collapse medium 54 into a medium that points to itself (i.e., has no underlying medium). This will ensure that future lookups to anchor medium 81 are more efficient by only having to perform lookups to at most two mediums. As part of the search optimization operation, address translation table entries may be consolidated for medium 54, resulting in all of the blocks of medium 54 being mapped directly from medium 54 rather than from a lower level medium as was previously the case. It is noted that while the search optimization operation is performed for medium 54, the user may still be able to perform a snapshot or xcopy operation to anchor medium 81.

The left-side of FIG. 5 shows the status of anchor medium 81 and medium 54 prior to the search optimization operation being performed. As shown in medium mapping table 505A, anchor medium 81 references medium 54, medium 54 has a range of 0-299 and an underlying medium of 38, and an offset of 200 is applied to blocks when going down to medium 38 from medium 54. It is noted that only the entries of the medium mapping table relevant to anchor medium 81 (and its underlying mediums) are shown in table 505A, and the entries show only pertinent attributes to avoid cluttering the figure. Medium graph 510A illustrates the relationships between the mediums prior to the search optimization operation taking place. As can be seen from medium graph 510A, anchor medium 81 points to medium 54, medium 54 points to medium 38, and medium 38 points to medium 37. It is noted that in other embodiments, there may be several other mediums below medium 37 in the medium graph.

Also on the left-side of FIG. 5 is address translation table 500A. Table 500A shows only index entries associated with anchor medium 81 and its underlying mediums. These entries may actually be scattered throughout the overall address translation table but are shown as being adjacent entries in table 500A merely for ease of illustration. It is also noted that there may be other levels of indirection in the overall address translation table that convert a medium and block number to a corresponding storage location, but these other levels are not shown to avoid cluttering the figure. The index entries shown in table 500A represent all of the index entries in the address translation table associated with anchor medium 81. While each entry in table 500A corresponds to a range size of 100 blocks, it is noted that in other embodiments, entries may correspond to other range sizes of other numbers of blocks.

It may be assumed for the purposes of this discussion that the storage controller performed a search to locate all index entries associated with anchor medium 81, and the index entries shown in table 500A represent the result of this search. In the example of FIG. 5, there are no index entries assigned to anchor medium 81, which nothing has been written to anchor medium 81 since it was created, and all blocks are mapped through mediums which underlie anchor medium 81. Therefore, the storage controller would search for index entries corresponding to the underlying medium of medium 81, which in this case is medium 54. However, for block 0 of medium 54, there is not an index entry assigned to medium 54. Therefore, the controller would search for index entries corresponding to the underlying medium of medium 54, which in this case is medium 38. Since medium 54 maps to medium 38 with an offset of 200, block 0 of medium 54 translates to block 200 of medium 38, and so the storage controller would perform a search for block 200 of medium 38. It is assumed that this lookup also resulted in a miss, in which case the storage controller would search the underlying medium of 38, which in this case is medium 37. Since medium 38 maps to medium 37 with an offset of 500, block 200 of medium 38 translates to block 700 of medium 37. In this case, a lookup for block 700 of medium 37 results in a hit, and the entry corresponding to block 700 of medium 37 is shown in table 500A.

A search for block 100 of medium 81 would eventually locate the entry for block 300 of medium 38, and accordingly, an entry corresponding to block 300 of medium 38 is shown in table 500A. A search for block 200 of medium 81 would locate an entry assigned to medium 54, and therefore, an entry corresponding to block 200 of medium 54 is shown in table 500A. It will be assumed for the purposes of this discussion that the three entries shown in table 500A cover the entire address space of anchor medium 81. It should be understood that some mediums may have large numbers of address translation entries and that the example of anchor medium 81 having only three corresponding entries is used solely for illustrative purposes.

A storage controller may perform a search optimization operation for medium 54, and the results of this operation are shown on the right-side of FIG. 5. The first three entries of address translation table 500B are the same as the entries of table 500A. The entries assigned to medium 38 and medium 37 may be reclaimed by the storage if these blocks of medium 38 and medium 37 are no longer reachable (by upper-level mediums or by user volumes). However, these entries may remain in table 500B for a period of time prior to being reclaimed.

Two new entries have been added to table 500B as part of the search optimization operation, and these two entries are assigned to medium 54. These two new entries correspond to blocks 0 and 100 of medium 54, and attributes (e.g., page, level) may be copied from the corresponding existing entries and stored in the new entries. After the search optimization operation for medium 54 is performed, a lookup of table 500B for any block of medium 54 will result in a hit for this lookup. Therefore, future lookups of anchor medium 81 and medium 54 will become more efficient. It is noted that other levels of address translation table 500B may also be updated as part of the search optimization operation for medium 54, but these updates are not shown in FIG. 5 to avoid cluttering the figure.

Medium mapping table 505B shows an updated entry for medium 54, which now points to itself as its own underlying medium. This is the case because a lookup of address translation table 500B for medium 54 will always result in a hit for any blocks of medium 54. Medium graph 510B also illustrates the new relationships between mediums after the search optimization operation, with medium 54 being its own underlying medium, with medium 81 still pointing to medium 54, and with medium 38 still pointing to medium 37.

Although not shown in FIG. 5, medium 54 may be the underlying medium of one or more other mediums. Any other upper-level mediums that have medium 54 as their underlying medium may benefit from more efficient lookups after the search optimization operation is performed since they will have fewer underlying mediums to traverse now that medium 54 has been consolidated. In addition, medium 81 may be into a quiesced medium since lookups for medium 81 will only have to search at most two mediums.

It is noted that in some embodiments, address translation tables 500A and 500B may have multiple levels of indirection and in these embodiments, each level of indirection which is accessed using a key generated from the medium ID and block number may be updated as part of the search optimization operation.

Although the example shown in FIG. 5 includes a small number of table entries and only three levels of underlying mediums beneath medium 81, in actual scenarios encountered by operational storage systems, the number of table entries and levels of underlying mediums may be substantially larger. In these embodiments, higher performance and efficiency gains can be attained by performing search optimization operations.

Turning now to FIG. 6, one embodiment of a portion of a medium mapping table 600 is shown. The entries for medium 5 shown in medium mapping table 600 illustrate another read optimization technique which may be utilized to collapse the medium graph by shortcutting the medium mapping table. Table 600 includes the same entries for medium 2 and medium 1 as shown in table 300 of FIG. 3. However, the entries for medium 5 have been updated to shortcut the table and reduce the number of lookups that are needed for medium 5.

Whereas medium 5 has a single entry in table 300 of FIG. 3, medium 5 now has two entries in table 600 after the shortcut has been created. Referring back to the single entry for medium 5 in table 300, the storage controller may detect that blocks 100-999 of medium 5 are only found in medium 2 (at the same offset), while these blocks in medium 2 are only found in medium 1. This condition may be detected by determining that blocks 100-999 of medium 2 are masked, which indicates that all blocks in this range in the underlying medium (medium 1). Therefore, the storage controller may split up the single entry for medium 5 in table 300 into two range entries in table 600. The first new entry is for blocks 0-99 of medium 5, and this entry is still in the registered, unmasked (RU) state with underlying medium 2. The second new entry is for blocks 100-999 of medium 5, and this entry is in the quiescent, unmasked (QU) state with underlying medium 1. Lookups for blocks 100-999 of medium 5 may now be performed in a single underlying medium search (medium 1) rather than requiring the storage controller to traverse two underlying mediums (medium 2 and medium 1).

Another technique for collapsing the medium graph is to merge one or more mediums that cannot be referenced externally. These one or more mediums may be merged to the medium directly above them in the medium graph. For example, referring back to table 300 of FIG. 3, if medium 10 were no longer externally visible, the storage controller could merge medium 10 with medium 14 by coalescing entries in medium 10 into medium 14 and renumbering these entries. While the storage controller could merge the mappings in medium 14 into medium 25, the storage controller could not then delete medium 14 because medium 18 still uses medium 14 as its underlying medium, even though medium 14 might not be externally visible.

The combination of all of these techniques can reduce the number of mediums in use by a storage system and optimize read operations to the data stored in the storage system. For storage systems that take frequent checkpoints and then forget them or lack external mappings to a portion of these checkpoints, these techniques can be especially beneficial for reducing the total number of mediums. In addition, for storage systems with long chains of mediums, these techniques can help ensure that lookups can be performed efficiently.

Figure 7:
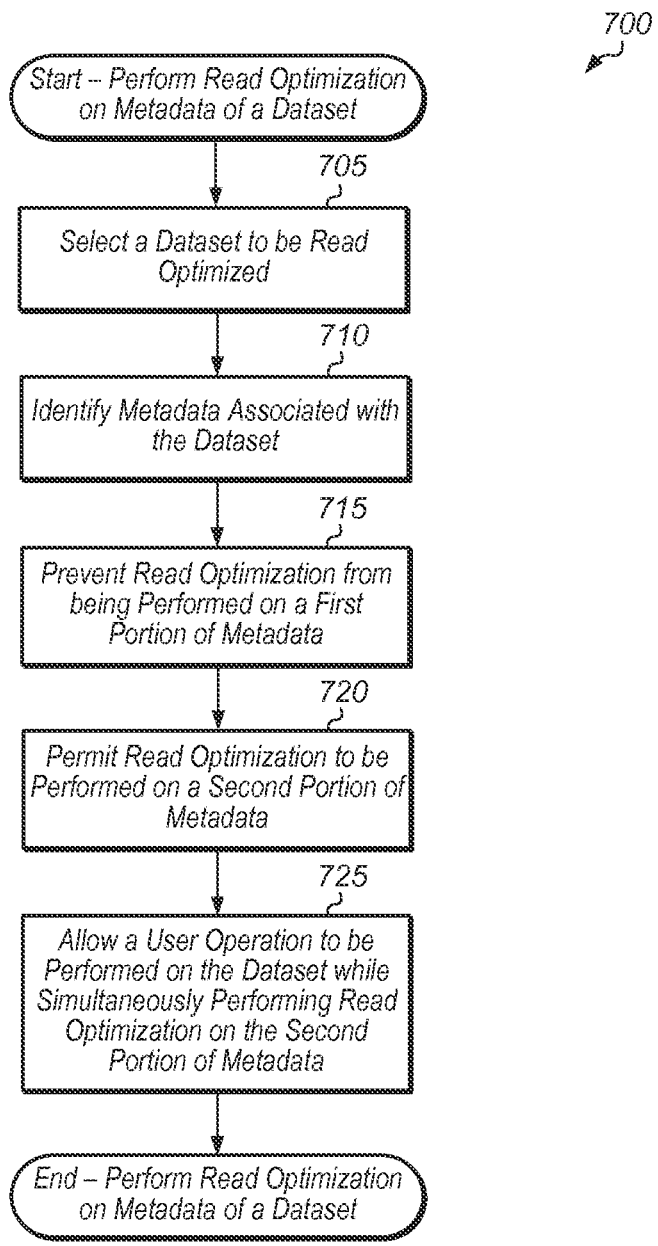
FIG. 7 is a generalized flow diagram illustrating one embodiment of a method for read optimizing metadata of a dataset.

Referring now to FIG. 7, one embodiment of a method 700 for read optimizing metadata of a dataset is shown. The components embodied in system 100 described (e.g., storage controller 110) may generally operate in accordance with method 700. In addition, the steps in this embodiment are shown in sequential order. However, some steps may occur in a different order than shown, some steps may be performed concurrently, some steps may be combined with other steps, and some steps may be absent in another embodiment.

A storage controller may select a dataset to be read optimized (block 705). In one embodiment, the dataset may be a volume. In response to selecting the dataset to be read optimized, the storage controller may identify metadata associated with the dataset (block 710). The metadata may be any type of data structure (e.g., one or more tables, search trees, etc.) and may include information (e.g., mappings, pointers) related to the logical and/or physical locations of the data of the dataset. In some embodiments, there may be multiple and varying levels of indirection between the user-addressable level of the dataset and the actual physical locations of the data. In one embodiment, the metadata may include a first portion which in a read-write state and a second portion which is in a read-only state. In one embodiment, the first portion of metadata may be updated when changes are made to the dataset while the second portion of metadata is stable and unchanging regardless of changes made to the dataset.

After identifying metadata associated with the dataset, the storage controller may prevent read optimization from being performed on the first portion of metadata (block 715). While preventing read optimization from being performed on the first portion of metadata, the storage controller may permit read optimization to be performed on the second portion of metadata (block 720). In one embodiment, performing read optimization may comprise reducing the number of levels of indirection between a given level of metadata and the actual physical locations of one or more blocks of data in the dataset. By performing read optimization on the second portion of metadata, the total number of mapping levels for at least a portion of the dataset's metadata may be reduced, making future lookups of the dataset more efficient.

Additionally, the storage controller may allow a user operation to be performed on the dataset while simultaneously performing read optimization on the second portion of metadata (block 725). After block 725, method 700 may end. In one embodiment, the user operation may access and alter the first portion of metadata while read optimization is being performed on the second portion of metadata. For example, in one embodiment, the user operation may be a snapshot, and when a snapshot is taken of the dataset, a new level of indirection may be created as part of the first portion of metadata. Also, as a result of the snapshot being taken of the dataset, an existing level of indirection may be removed from the first portion of metadata and added to the second portion of metadata.

Figure 8:
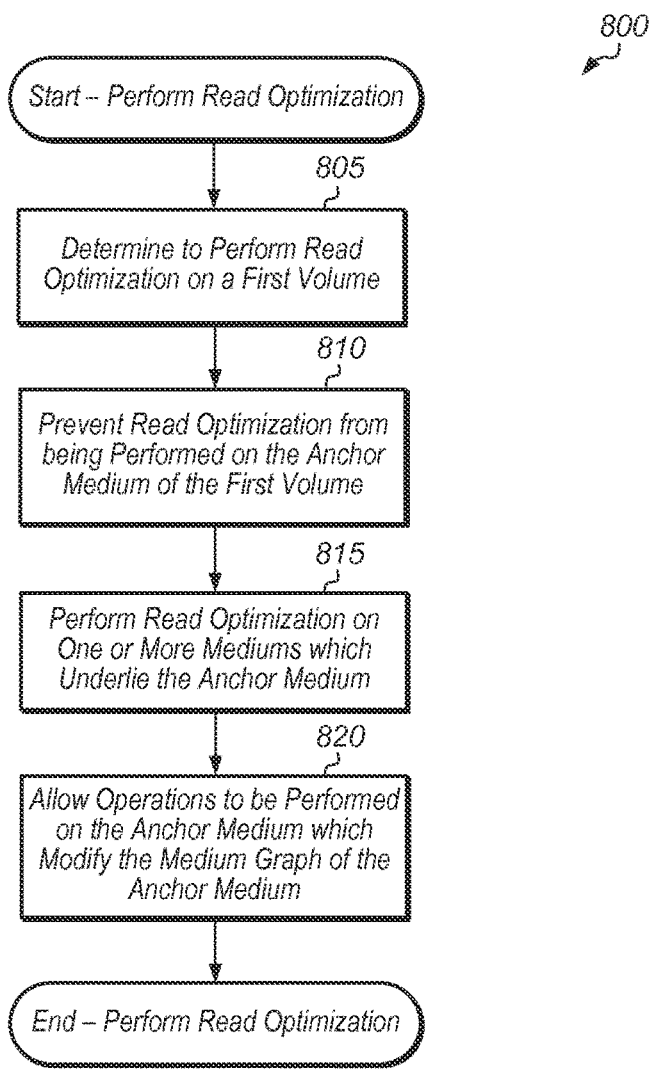
FIG. 8 is a generalized flow diagram illustrating one embodiment of a method for performing a read optimization operation.

Turning now to FIG. 8, one embodiment of a method 800 for performing read optimization is shown. The components embodied in system 100 described above (e.g., storage controller 110) may generally operate in accordance with method 800. In addition, the steps in this embodiment are shown in sequential order. However, some steps may occur in a different order than shown, some steps may be performed concurrently, some steps may be combined with other steps, and some steps may be absent in another embodiment.

A storage controller may determine to perform read optimization on a first volume (block 805). In various embodiments, any of a variety of triggers may cause the storage controller to initiate performing read optimization on the first volume. For example, in one embodiment, read latencies may be longer than desired (e.g., longer than a given threshold). Alternatively, an amount of metadata used to access data may grow to an undesirably large amount. As another example, the number of underlying mediums below the first volume in the first volume's medium hierarchy may have reached a programmable threshold. For example, the number of underlying mediums may reach the threshold if a large number of snapshots have been taken of the first volume. In some, the storage controller may determine to perform read optimization when the number of snapshots taken for the first volume has reached a given programmable threshold. It is noted that as the number of underlying mediums of a given volume increases, the inefficiency of performing read operations to the given volume may generally increase. Alternatively, in another embodiment, the storage controller may perform read optimization when the storage system is experiencing low activity. In a further embodiment, the storage controller may perform read optimization on a schedule, such as every 24 hours (e.g., according to a system time clock, or elapsed period of time). Then, when the storage controller has determined to perform read optimization, the storage controller may select volumes for optimizing using any of various techniques (e.g., random selection, round robin, volume with the highest number of underlying mediums). In some cases, the storage controller may perform read optimization on multiple volumes simultaneously.

In response to determining to perform read optimization on the first volume, the storage controller may prevent read optimization from being performed on the anchor medium of the first volume (block 810). Since the anchor medium of the first volume is in a read-write state and may be the target of other operations, the storage controller may prevent read optimization from being performed on the anchor medium. While read optimization is prevented from being performed on the anchor medium of the first volume, read optimization may be performed on one or more mediums which underlie the anchor medium (block 815). While read optimization is being performed on one or more mediums which underlie the anchor medium, the storage controller may allow operations (e.g., snapshots, xcopy operations) to be performed on the first volume which modify the medium graph of the anchor medium (block 820). For example, while read optimization is being performed on one or more mediums which underlie the anchor medium, a snapshot may be taken of the first volume. The snapshot will cause a new medium to be created as the new anchor medium of the first volume, with this new anchor medium pointing to the old anchor medium, and with the old anchor medium read-only. After block 820, method 800 may end. It is noted that any number of separate parallel instances of method 800 may be performed simultaneously for any number of separate volumes.

Figure 9:
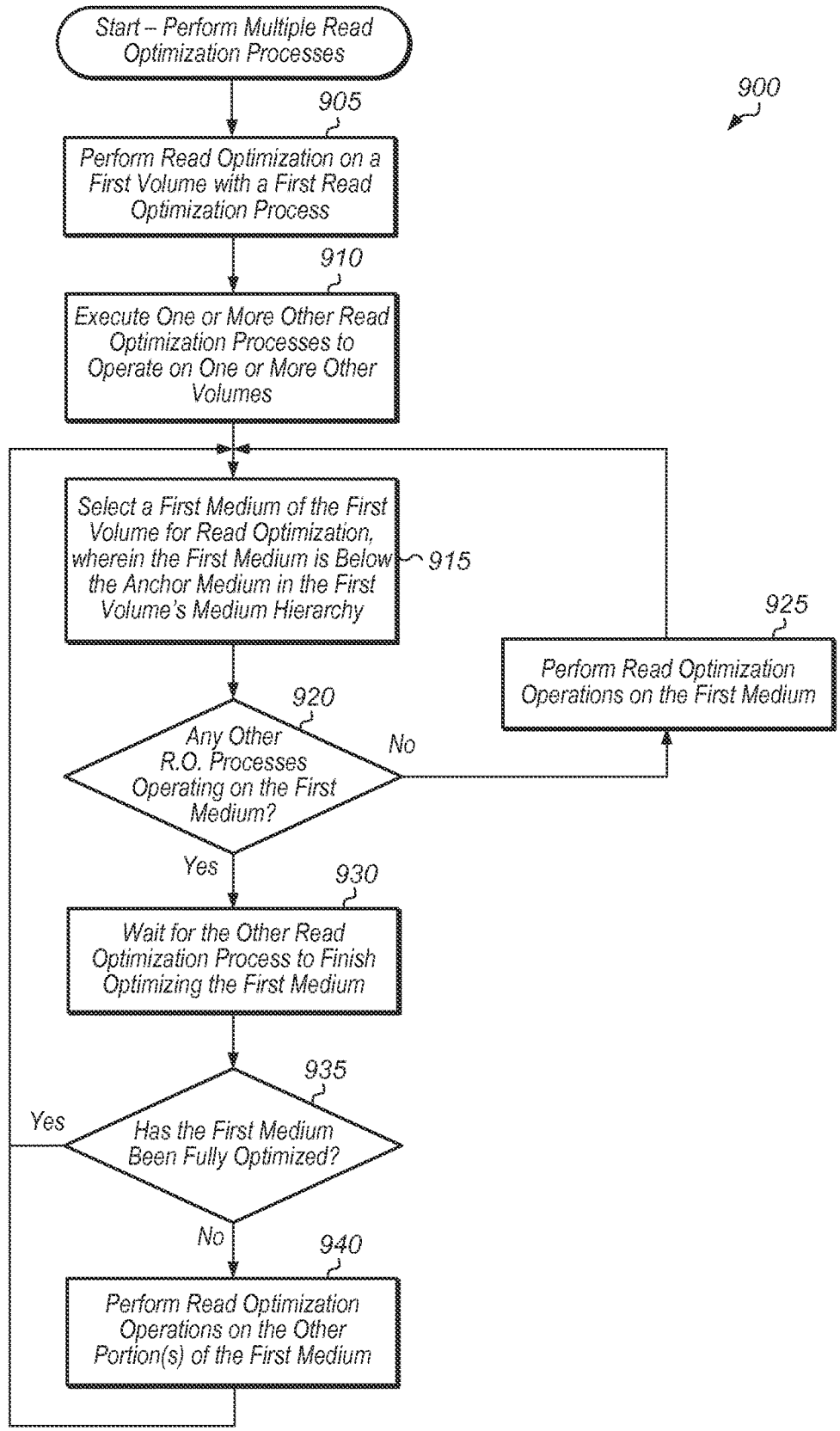
FIG. 9 is a generalized flow diagram illustrating one embodiment of a method for performing multiple simultaneous read optimization operations.

Referring now to FIG. 9, one embodiment of a method 900 for performing multiple simultaneous read optimization processes is shown. The components embodied in system 100 described above (e.g., storage controller 110) may generally operate in accordance with method 900. In addition, the steps in this embodiment are shown in sequential order. However, some steps may occur in a different order than shown, some steps may be performed concurrently, some steps may be combined with other steps, and some steps may be absent in another embodiment.

In one embodiment, a first read optimization process may perform read optimization on a first volume stored in the storage system (block 905). It is noted that the first read optimization process may only perform read optimization on the read-only mediums below the anchor medium in the medium hierarchy of the first volume. Simultaneously with the first read optimization process, one or more other read optimization processes may be executed by the storage controller to operate on one or more other volumes stored in the storage system (block 910). Next, the first read optimization process may select a first medium of the first volume for read optimization, wherein the first medium is below the anchor medium in the first volume's medium hierarchy (block 915).

After selecting the first medium but prior to beginning to read optimize the first medium, the first read optimization process may determine if any other read optimization (R.O.) processes are currently optimizing the first medium (conditional block 920). For example, in one embodiment, the first medium may be in the first volume's medium hierarchy as well as in the medium hierarchy of one or more other volumes. Accordingly, in one scenario, a second read optimization process may be a second volume which includes the first medium, and the second read optimization process may already be performing read optimization on the first medium when the first read optimization process selects the first medium.

If the first read optimization process determines that no other read optimization processes are currently optimizing the first medium (conditional block 920, "no" leg), then the first read optimization process may perform read optimization operations on the first medium (block 925). The read optimization operations may include consolidating address translation table entries for the first medium, shortcutting the medium mapping table entries for the first medium, and merging one or more other mediums with the first medium. After block 925, method 900 may return to block 915 with the first read optimization process selecting another medium of the first volume to optimize. If the first read optimization process detects that another read optimization process is currently optimizing the first medium (conditional block 920, "yes" leg), then the first read optimization process may wait for the other read optimization process to finish optimizing the first medium (block 930). Then, after the other read optimization process has finished optimizing the first medium, the first read optimization process may determine if the first medium has already been fully optimized (conditional block 935). In some cases, the first medium may be fully optimized by the other read optimization process. For example, another volume may map to the entire range of the first medium, and therefore, the other read optimization may optimize the entirety of the first medium. However, in another scenario, the first volume may map to a first portion of the first medium and the other volume may map to a second portion of the first medium, wherein the first portion includes one or more blocks or sectors which are not included in the second portion. Therefore, in this scenario, the other read optimization process may only optimize the second portion of the first medium, and after the other read optimization process finishes processing the second portion of the first medium, the first read optimization process may determine that the first portion of the first medium can still be optimized.

If the first read optimization process determines that the first medium has not been fully optimized (conditional block 935, "no" leg), then the first read optimization process may optimize the other portion(s) of the first medium (block 940). After block 940, method 900 may return to block 915 with the first read optimization process selecting another medium of the first volume to optimize. If the second read optimization process determines that the first medium has already been fully optimized (conditional block 935, "yes" leg), method 900 may return to block 915 to select another medium of the first volume to optimize.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A system comprising:
   one or more storage devices; and
   a storage controller coupled to the one or more storage devices, wherein responsive to selecting a dataset to be read optimized, the storage controller is configured to:
     identify metadata associated with the dataset, wherein the metadata includes:
       an active logical grouping of data that is in a read-write state and corresponds to an anchor logical grouping of data; and
       non-active logical groupings of data that are in a read-only state and correspond to one or more logical data groupings which underlie the anchor logical grouping of data;
     based on the metadata associated with the dataset, select one or more of the non-active logical groupings of data for a read optimization operation; and
     perform a user operation on the dataset using the active logical grouping of data that is in the read-write state, while simultaneously:

performing the read optimization operation on the selected one or more non-active logical groupings of data by reducing the number of mappings within the non-active logical groupings of data; and preventing the read optimization operation from being performed on the active logical grouping of data in the read-write state.

2. The system as recited in claim 1, wherein reducing the number of mappings within the non-active logical groupings of data comprises collapsing a particular medium to make the particular medium point to itself.

3. The system as recited in claim 1, wherein reducing the number of mappings within the non-active logical groupings of data comprises modifying address translation table entries for a particular medium such that blocks corresponding to the particular medium are mapped directly from the particular medium.

4. The system as recited in claim 1, wherein the storage controller is configured to select the dataset to be read optimized responsive to at least one of: an amount of metadata has reached a given threshold, read access latency is longer than desired, a scheduled time has arrived, a predetermined period of time since a last read optimization has elapsed, and detecting a number of mediums has reached threshold.

5. A method comprising:
selecting a dataset to be read optimized;
responsive to selecting the dataset to be read optimized:
identifying metadata associated with the dataset, wherein the metadata includes:
an active logical grouping of data that is in a read-write state and corresponds to an anchor logical grouping of data; and
non-active logical groupings of data that are in a read-only state and correspond to one or more logical data groupings which underlie the anchor logical grouping of data;
based on the metadata associated with the dataset, selecting one or more of the non-active logical groupings of data for a read optimization operation; and
performing a user operation on the dataset using the active logical grouping of data that is in the read-write state, while simultaneously:
performing the read optimization operation on the selected one or more non-active logical groupings of data by reducing the number of mappings within the non-active logical groupings of data; and
preventing the read optimization operation from being performed on the active logical grouping of data in the read-write state.

6. The method as recited in claim 5, wherein reducing the number of mappings within the non-active logical groupings of data comprises collapsing a particular medium to make the particular medium point to itself.

7. The method as recited in claim 5, wherein reducing the number of mappings within the non-active logical groupings of data comprises consolidating address translation table entries for a particular medium, resulting in all blocks of the particular medium being mapped directly from the particular medium.

8. The method as recited in claim 5, further comprising selecting the dataset to be read optimized responsive to at least one of: an amount of metadata has reached a given threshold, read access latency is longer than desired, a scheduled time has arrived, a predetermined period of time since a last read optimization has elapsed, and detecting a number of mediums has reached threshold.

9. A non-transitory computer readable storage medium storing program instructions, wherein the program instructions are executable by a processor to:
select a dataset to be read optimized;
responsive to selecting the dataset to be read optimized:
identify metadata associated with the dataset, wherein the metadata includes:
an active logical grouping of data that is in a read-write state and corresponds to an anchor logical grouping of data; and
non-active logical groupings of data that are in a read-only state and correspond to one or more logical data groupings which underlie the anchor logical grouping of data;
based on the metadata associated with the dataset, select one or more of the non-active logical groupings of data for a read optimization operation; and
perform a user operation on the dataset using the active logical grouping of data that is in the read-write state, while simultaneously:
performing the read optimization operation on the selected one or more non-active logical groupings of data by reducing the number of mappings within the non-active logical groupings of data; and
preventing the read optimization operation from being performed on the active logical grouping of data in the read-write state.

10. The non-transitory computer readable storage medium as recited in claim 9, wherein reducing the number of mappings within the non-active logical groupings of data comprises collapsing a particular medium to make the particular medium point to itself.

11. The non-transitory computer readable storage medium as recited in claim 9, wherein reducing the number of mappings within the non-active logical groupings of data comprises consolidating address translation table entries for particular medium, resulting in all blocks of the particular medium being mapped directly from the particular medium.

* * * * *